(12) United States Patent
Hornok, Jr. et al.

(10) Patent No.: US 7,093,013 B1
(45) Date of Patent: Aug. 15, 2006

(54) HIGH AVAILABILITY SYSTEM FOR NETWORK ELEMENTS

(75) Inventors: Michael Ronald Hornok, Jr., Sachse, TX (US); Bradley Allen Brown, Richardson, TX (US); Steve M. Bullock, Wylie, TX (US)

(73) Assignee: Alcatel, Paris (FR)

( * ) Notice: Subject to any disclaimer, the term of this patent is extended or adjusted under 35 U.S.C. 154(b) by 773 days.

(21) Appl. No.: 10/174,776

(22) Filed: Jun. 19, 2002

(51) Int. Cl.
G06F 15/173 (2006.01)

(52) U.S. Cl. ................ 709/224; 370/240.1; 714/47

(58) Field of Classification Search ........... 709/224, 709/202, 223; 714/47, 4, 25; 370/241.1
See application file for complete search history.

(56) References Cited

U.S. PATENT DOCUMENTS

| | | | | |
|---|---|---|---|---|
| 5,852,724 | A * | 12/1998 | Glenn et al. ............... | 709/239 |
| 5,872,931 | A * | 2/1999 | Chivaluri ................... | 709/223 |
| 5,944,782 | A * | 8/1999 | Noble et al. ............... | 709/202 |
| 6,012,152 | A * | 1/2000 | Douik et al. ................ | 714/26 |
| 6,014,686 | A * | 1/2000 | Elnozahy et al. .......... | 709/202 |
| 6,460,070 | B1 * | 10/2002 | Turek et al. ............... | 709/202 |
| 6,487,216 | B1 * | 11/2002 | Thompson et al. ......... | 370/466 |
| 6,838,986 | B1 * | 1/2005 | Shteyn ...................... | 340/531 |
| 2003/0005152 | A1 * | 1/2003 | Diwan et al. .............. | 709/239 |
| 2003/0061340 | A1 * | 3/2003 | Sun et al. .................. | 709/224 |
| 2003/0158933 | A1 * | 8/2003 | Smith ........................ | 709/224 |
| 2004/0030778 | A1 * | 2/2004 | Kronenberg ............... | 709/224 |

OTHER PUBLICATIONS

"VERITAS Cluster Server v2.0: Technical Overview." Sep. 2001. VERITAS Software Corporation: USA.

"VERITAS Cluster Server." Aug. 2001. VERITAS Software Corporation: USA.

"High Availability Clustering in a Microsoft Windows Environment." Dec. 2000. VERITAS Software Corporation: USA.

Telcordia Technologies: Synchronous Optical Network (SONET) Transport Systems: Common Generic Criteria; GR-253-CORE; Sep. 2000; Issue 3, Sections 6 and 8.

Leroux; QNX Software Systems, Ltd.; Whitepaper; Think Outside the Box: A High-Availability Primer; 2001; pp. 1-8.

* cited by examiner

*Primary Examiner*—Abdullahi Salad
(74) *Attorney, Agent, or Firm*—Jessica W. Smith; V. Lawrence Sewell

(57) ABSTRACT

A method, computer program product, and data processing system for establishing high-availability of network resources through automatic failover, while cooperating with existing telecommunications equipment management and other systems is disclosed. Events are filtered through a series of software modules, each having a particular role to play with respect to the event. External systems may register with a "Notification Dispatcher" module, included within the series of modules, to receive notifications when particular events occur. In this way, conflicts between the high-availability system and other systems are avoided through well-defined sharing of information and delegation of responsibilities. Other modules may include "Resource Agents" and a "Resource Agent Adapter" for performing monitoring and control functions with respect to individual resources through a unified interface, a "Node Failover Manager" for actually performing an automatic failover, and a "Failover Rules Engine" for intelligently deciding when a given resource should experience a failover.

12 Claims, 10 Drawing Sheets

HIGH AVAILABILITY SYSTEM FOR NETWORK ELEMENTS

BACKGROUND OF THE INVENTION

1. Technical Field

The present invention relates generally to providing high availability of resources within a managed network. More specifically, the present invention is directed toward providing a high availability mechanism that is capable of operating in cooperation with telecommunications equipment management software running on an Operations, Administration, Maintenance, and Procedures (OAM&P) processor complex.

2. Description of Related Art

The management of a computer network is not a simple task. Today's networks are complex beasts. As organizations move more and more toward high-connectivity, large networks containing a wide variety of hardware and software systems connected in bewildering topologies have begun to emerge. As networks become more complex, their upkeep becomes increasingly difficult. In the telecommunications domain Operations, Administration, Maintenance and Procedures (OAM&P) systems are software and hardware systems designed to assist network support personnel in the management of such network elements.

An OAM&P system will typically include what is known as a telecommunications equipment management (TEM) subsystem. An TEM subsystem monitors the state of network equipment and handles equipment provisioning for field replaceable units (FRUs). Field replaceable units are units of equipment that can be replaced in the event of a failure.

While TEM assists human support personnel in handling equipment failures, in mission-critical applications, such as telephone communications, waiting for a support person to take care of a problem may be unacceptable. High-availability (HA) systems address this need by providing "failover" of failed resources. "Failover" means automatically switching from the failed resource to a backup or redundant resource. A "resource," in this context, may be a hardware component or software component—essentially anything that is capable of failing.

CLUSTER SERVER™, produced by Veritas Software Corporation of Mountain View, Calif., is one example of an HA system that is commercially available. CLUSTER SERVER™ monitors groups of resources controlled by "clusters" of computer systems. In the event of a failure in a resource, CLUSTER SERVER™ can deactivate the resource and replace it with another "backup" resource (i.e., it performs a failover of the resource). CLUSTER SERVER™ is capable of monitoring a number of disparate resources concurrently and is sensitive to dependencies between resources. If necessary, CLUSTER SERVER™ can deactivate multiple resources in the correct order, when dependencies between the resources require it.

CLUSTER SERVER™ and HA systems, in general, may overlap in their responsibilities with TEM systems. Because both HA systems and TEM systems monitor the status of network resources and take action in response to the status of those resources, conflicts may arise between an HA system and TEM system operating on the same network. For example, when a resource is being removed from service using the TEM system and unbeknownst to the HA system, the HA system may attempt an unwanted failover.

A need exists, therefore, for a system that can provide configurable HA features, while cooperating with existing TEM systems to avoid conflicts.

SUMMARY OF THE INVENTION

The present invention provides a method, computer program product, and data processing system for establishing high-availability of network resources through automatic failover, while cooperating with existing telecommunications equipment management and other systems running on an Operations, Administration, Maintenance, and Procedures (OAM&P) processor complex. Telecommunications equipment management and OAM&P systems are described in "SONET Transport Systems: Common Generic Criteria", Telecordia Technologies, GR-253-CORE, Issue 3, September 2000, Section 6: SONET Network Element Operation Criteria, Section 8: SONET Operations Communications. Events, such as a "heartbeat failure," are filtered through a series of software modules, each having a particular role to play with respect to the event. External systems, such as a telecommunication equipment management system, may register with a "Notification Dispatcher" module, included within the series of modules, to receive notifications when particular events occur. In this way, conflicts between the high-availability system and other systems are avoided through well-defined sharing of information and delegation of responsibilities.

Other modules may include "Resource Agents" and a "Resource Agent Adapter" for performing monitoring and control functions with respect to individual resources through a unified interface, a "Node Failover Manager" for actually performing an automatic failover, and a "Failover Rules Engine" for intelligently deciding when a given resource should experience a failover.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
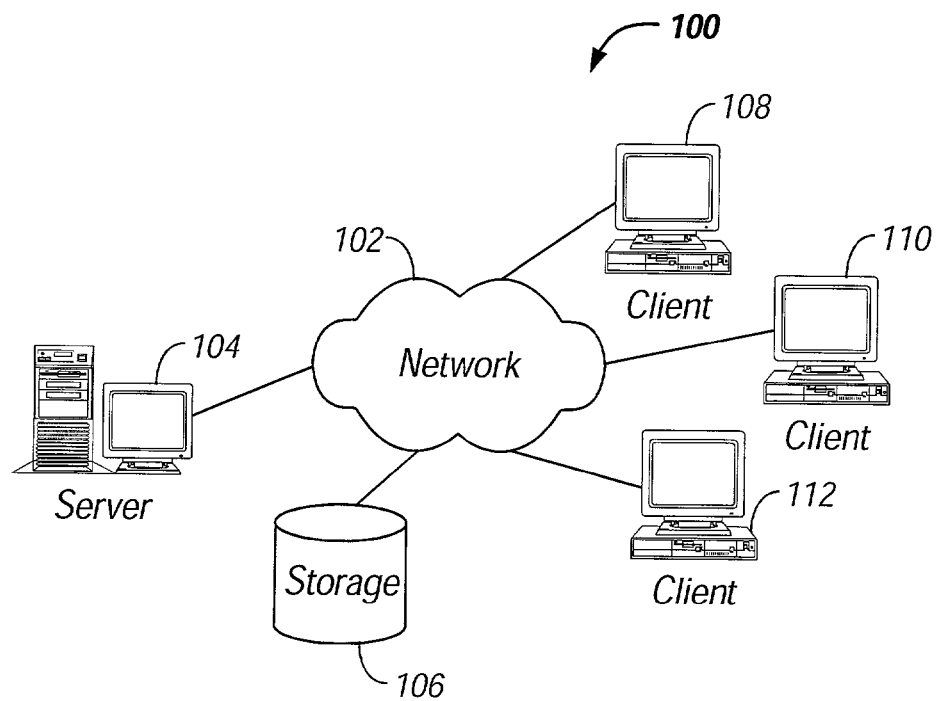
FIG. 1 is a diagram of a networked data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
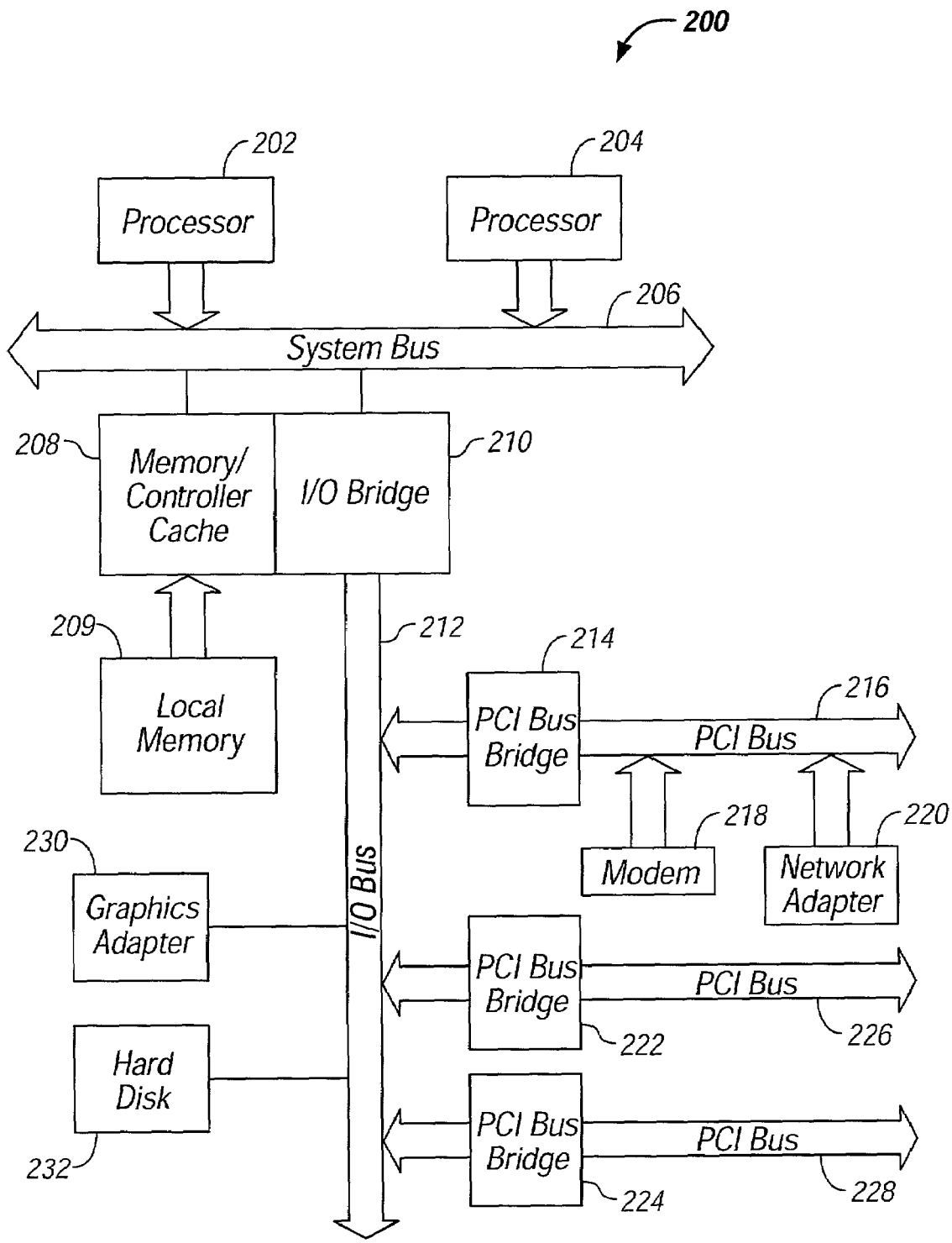
FIG. 2 is a block diagram of a server system within the networked data processing system of FIG. 1.

Referring to FIG. 2, a block diagram of an exemplary data processing system that may be used as a hardware platform for a preferred embodiment of the present invention. The data processing system in FIG. 2 may be used as server 104 in FIG. 1, for example. Data processing system 200 may be a symmetric multiprocessor (SMP) system including a plurality of processors 202 and 204 connected to system bus 206. Alternatively, other multiprocessor arrangements or a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system. As another example, FIG. 2 may be an embedded computer system executing a real-time operating system, such as VxWorks. VxWorks is produced by Wind River Systems, Inc. of Alameda, Calif. As yet another example, FIG. 2 may be a network element, such as the 1680 OGX Optical Gateway Cross Connect, produced by Alcatel, S.A. of Paris, France.

The present invention is directed toward a method, computer program product, and data processing system for providing high availability in a networked data processing system. Specifically, the present invention is directed toward an extensible architecture for providing high availability features in a cooperative manner with respect to telecommunications equipment management (TEM) or other administrative systems. High availability is generally achieved by providing standby resources to take the place of active resources in the event of a failure. One of ordinary skill in the art will recognize that the term "resource" encompasses a wide variety of things. For example, hardware resources include data processing systems, such as servers, routers or networks, and their components, including peripheral components. Software resources include software processes executing on data processing systems, databases, or other repositories of data, and the like. Essentially, a resource is anything that has a possibility of failure. The present invention is directed toward insuring high availability of resources, even when management of those resources is shared with other software.

Figure 3:
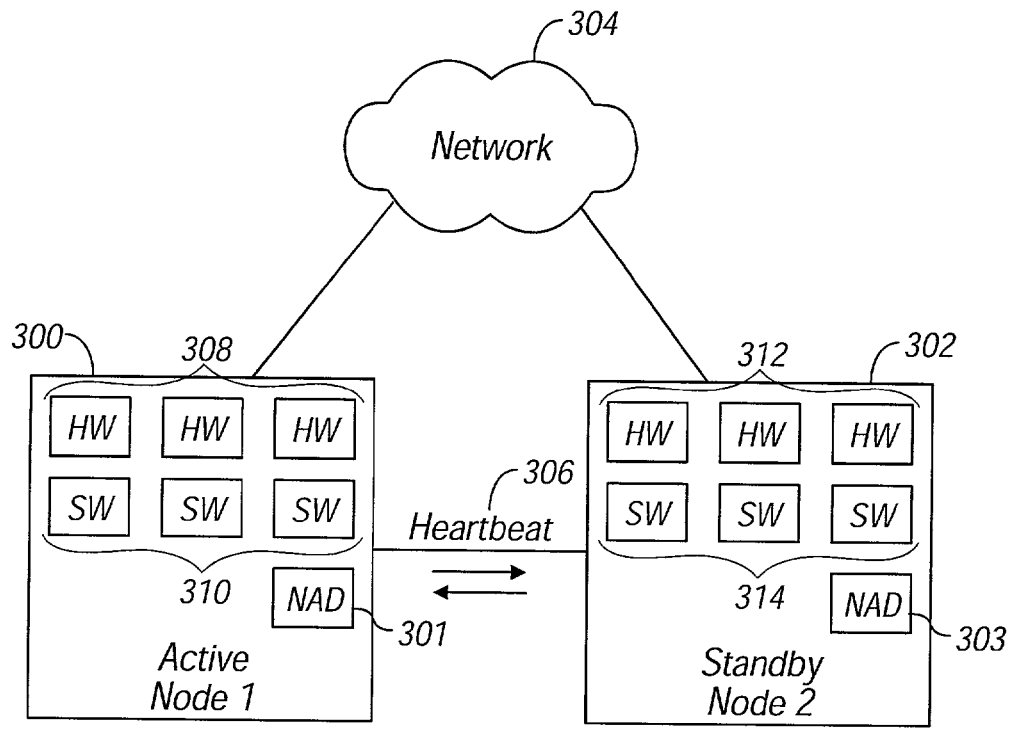
FIG. 3 is a diagram providing an overall view of an active node and a standby node in accordance with the preferred embodiment of the present invention.

FIG. 3 is a diagram providing an overall view of an active node and a standby node in accordance with the preferred embodiment of the present invention. Active node 300 and standby node 302 are data processing systems connected to a network 304. One of ordinary skill in the art will recognize that active node 300 and standby node 302 could be of any one of a number of types of data processing system, including servers, clients, routers, mainframes, distributed computing systems, and the like. One of ordinary skill in the art will also recognize that active node 300 and standby node 302 need not be connected in a network, but may communicate in other ways, such as through a direct connection between the nodes.

Active node 300 has a network availability daemon 301, which monitors resources and provides for failover in the event that a resource fails. A daemon is a software process that operates in the background, waiting for particular conditions to occur. Standby node 302 also has a node availability daemon 303, which monitors resources associated with standby node 302.

Active node 300 and standby node 302 also monitor each other. Active node 300 and standby node 302 send each other heartbeat messages 306, which tell the other node that the node that sent the heartbeat message is operational. Node availability daemon 301 on active node 300 monitors heartbeat messages that come from standby node 302, and likewise, node availability daemon 303 monitors heartbeat messages that come from active node 300. If node availability daemon 303 stops receiving heartbeat messages from active node 300, standby node 302 will attempt a failover of active node 300. That is, standby node 302 will stand in for the failed active node 300. Likewise, if node availability daemon 301 stops receiving heartbeat messages from standby node 302, active node 300 will take appropriate action to see that standby node 302 is placed back in working order. This may involve notifying human administrative personnel to take corrective action, possibly through a telecommunications equipment management system, as will be seen in subsequent figures.

In addition to monitoring heartbeat messages 306, node availability daemons 301 and 303 also manage other resources associated with active node 300 and standby node 302. These resources may include hardware resources, such as hardware resources 308 which are associated with active node 300. These resources may also include software resources, such as software resources 310, associated with active node 300. For example, node availability daemon 301, in the event that one of hardware resources 308 fails, may failover the failed resource with other hardware resource from hardware resources 308 or from hardware resources 312 on standby node 302.

Figure 4:
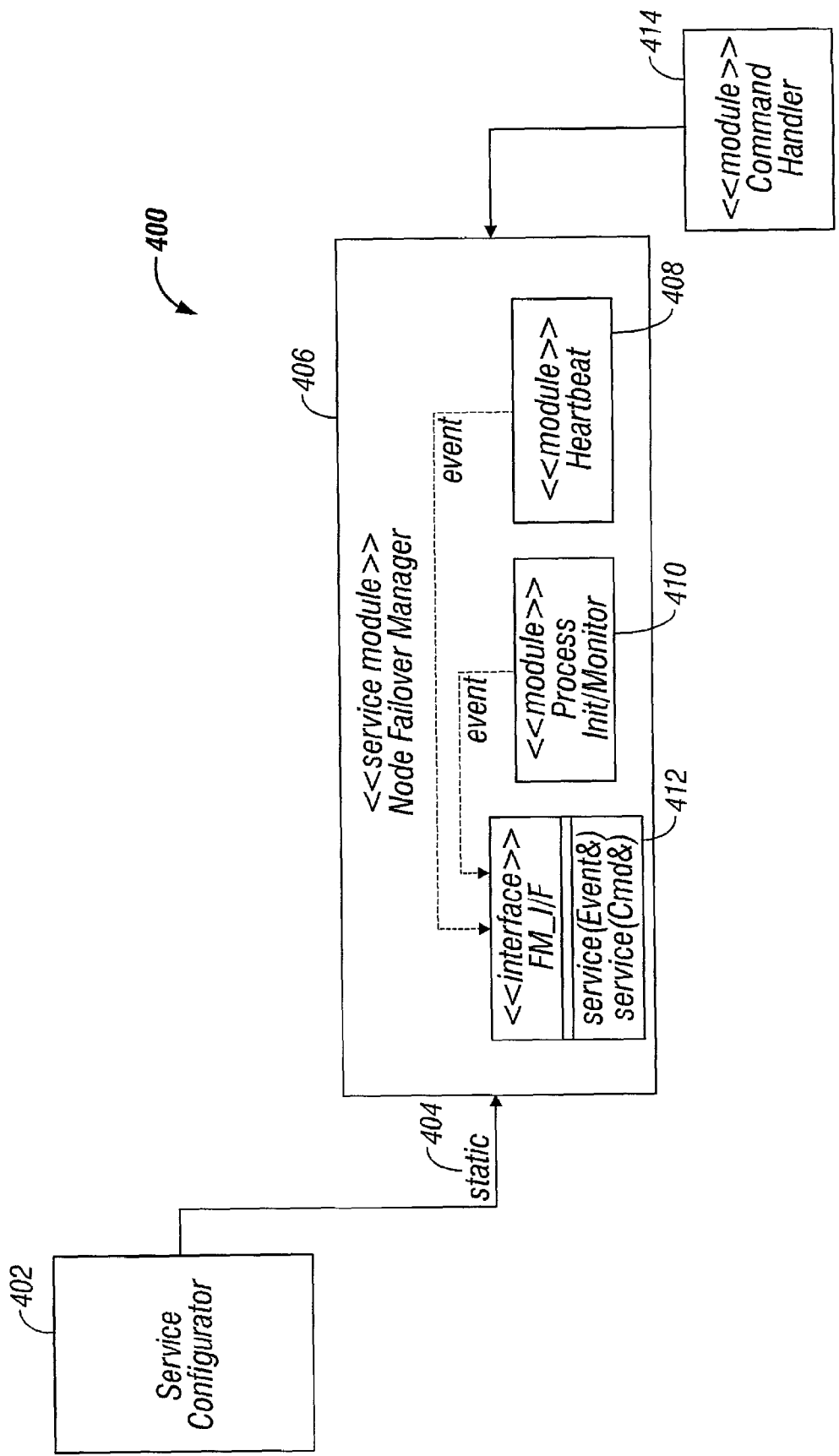
FIG. 4 is a diagram depicting a minimal architectural configuration of a node availability daemon in accordance with a preferred embodiment of the present invention.
Figure 6A:
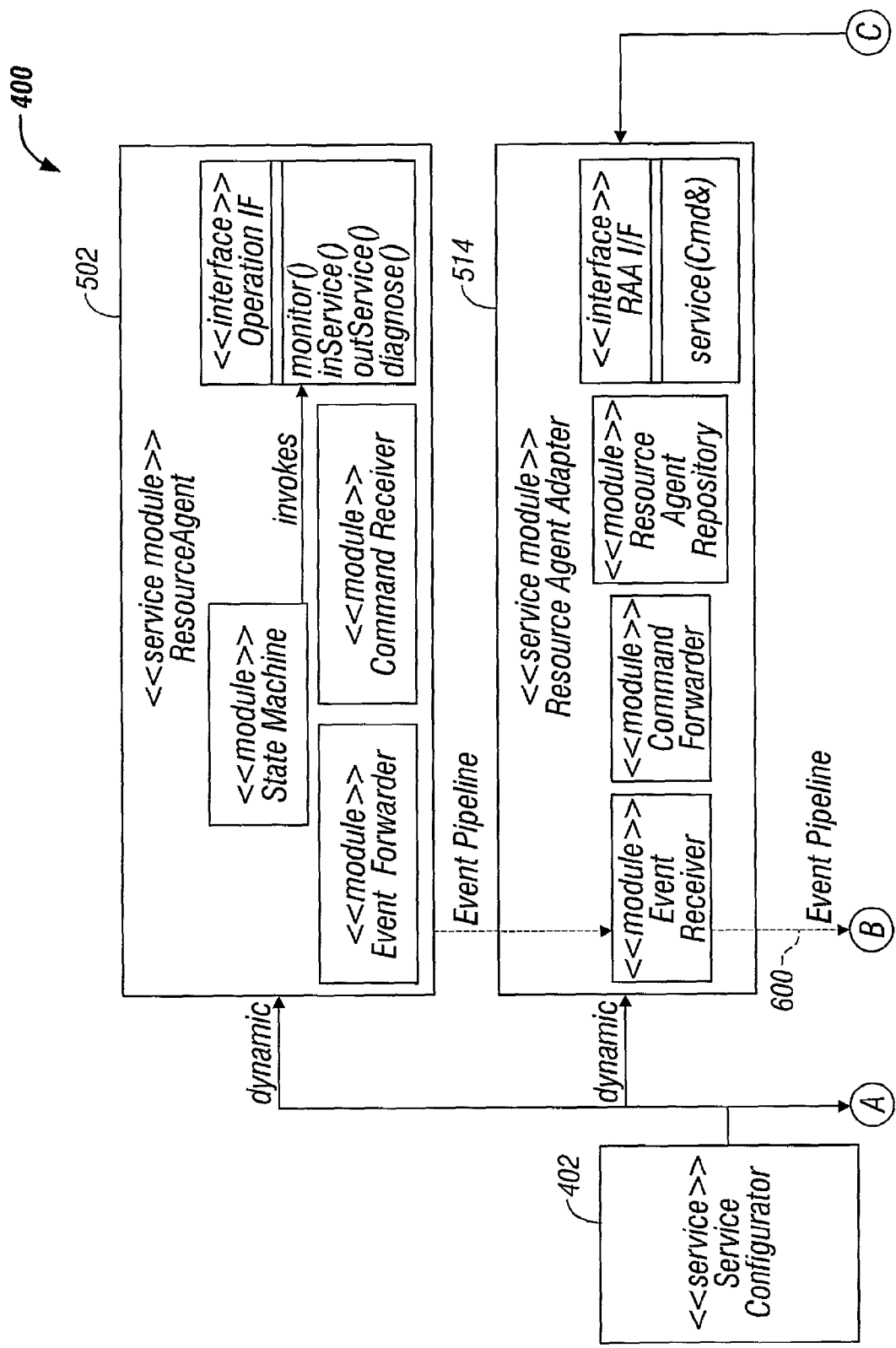
FIGS. 6A and 6B constitute a diagram depicting a configuration of a node availability daemon including a failover rules engine in accordance with a preferred embodiment of the present invention.
Figure 6B:
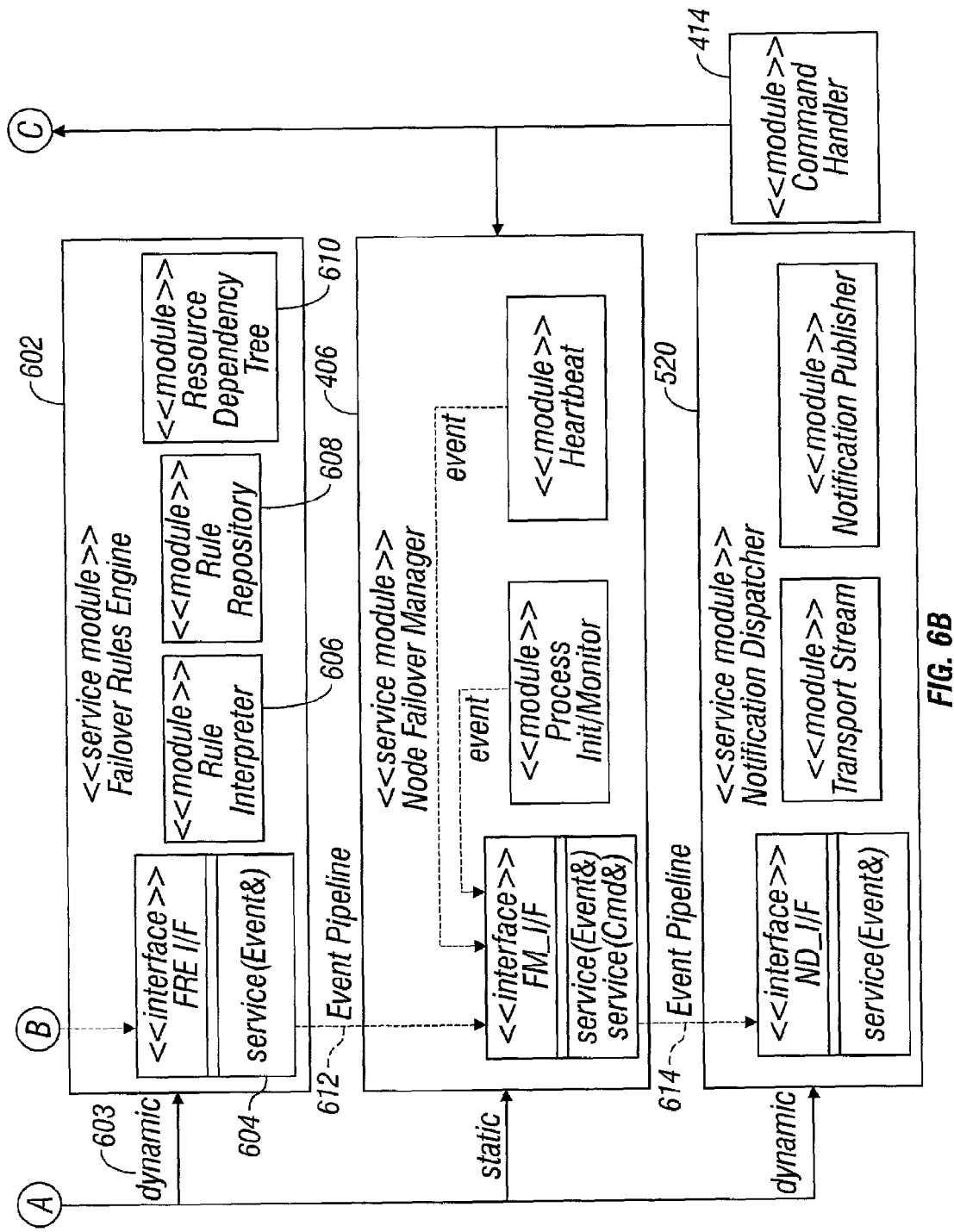
Figure 7:
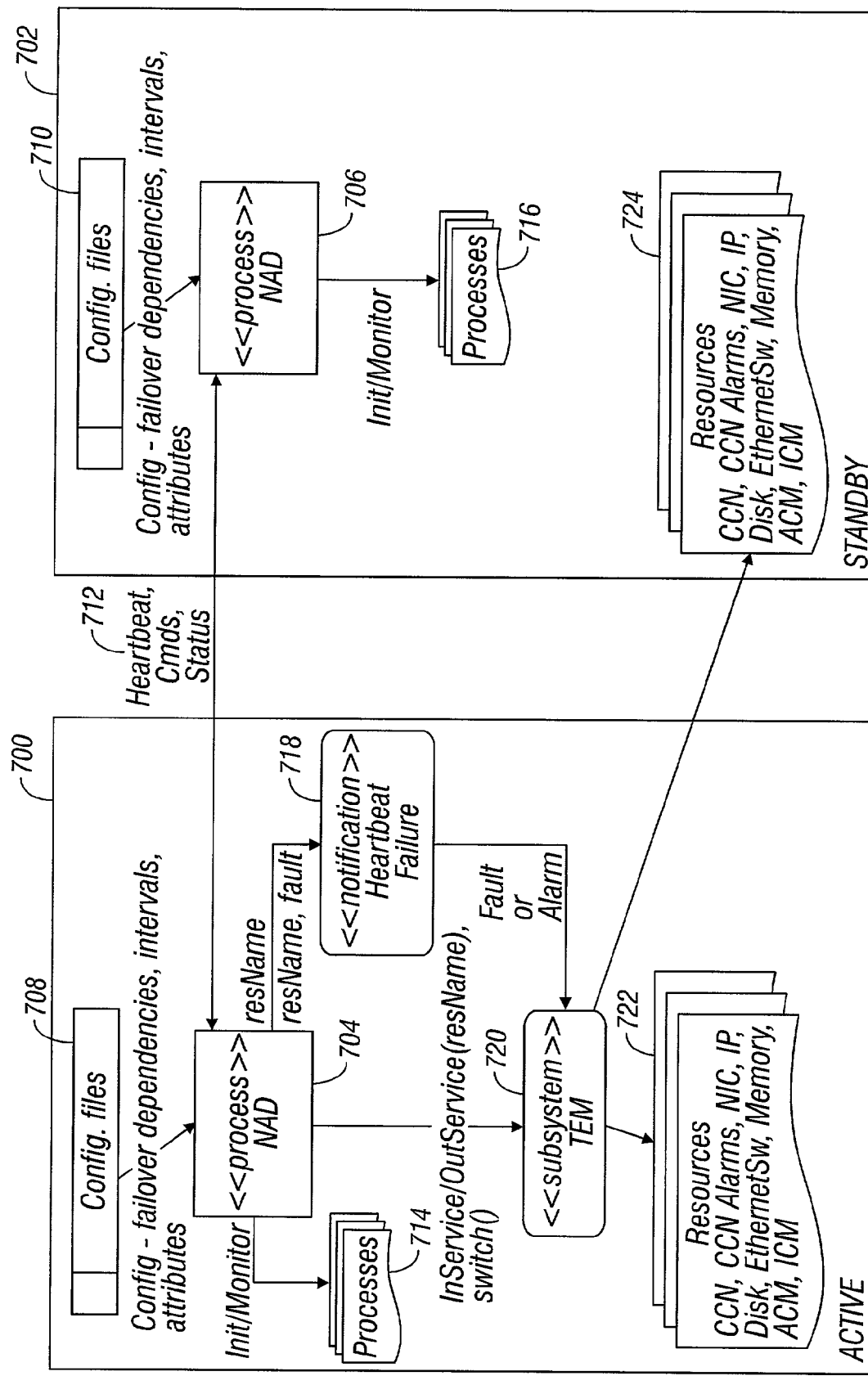
FIG. 7 is a diagram depicting the operation of a minimal-configuration node availability daemon in conjunction with a telecommunications equipment management subsystem in accordance with a preferred embodiment of the present invention.
Figure 8A:
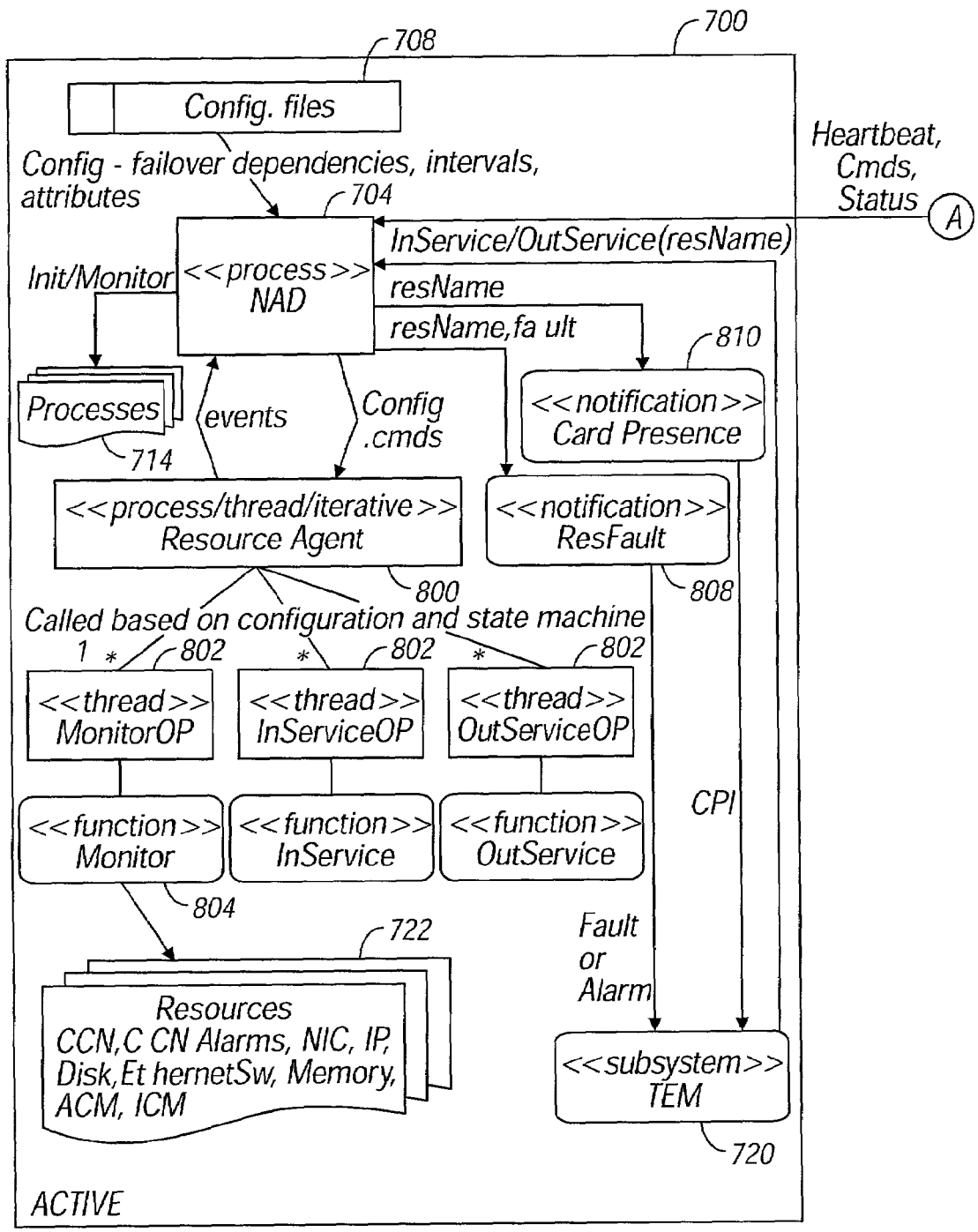
FIGS. 8A and 8B constitute a diagram depicting the operation of a more expansively configured node availability daemon in conjunction with a telecommunications equipment management subsystem in accordance with a preferred embodiment of the present invention.
Figure 8B:
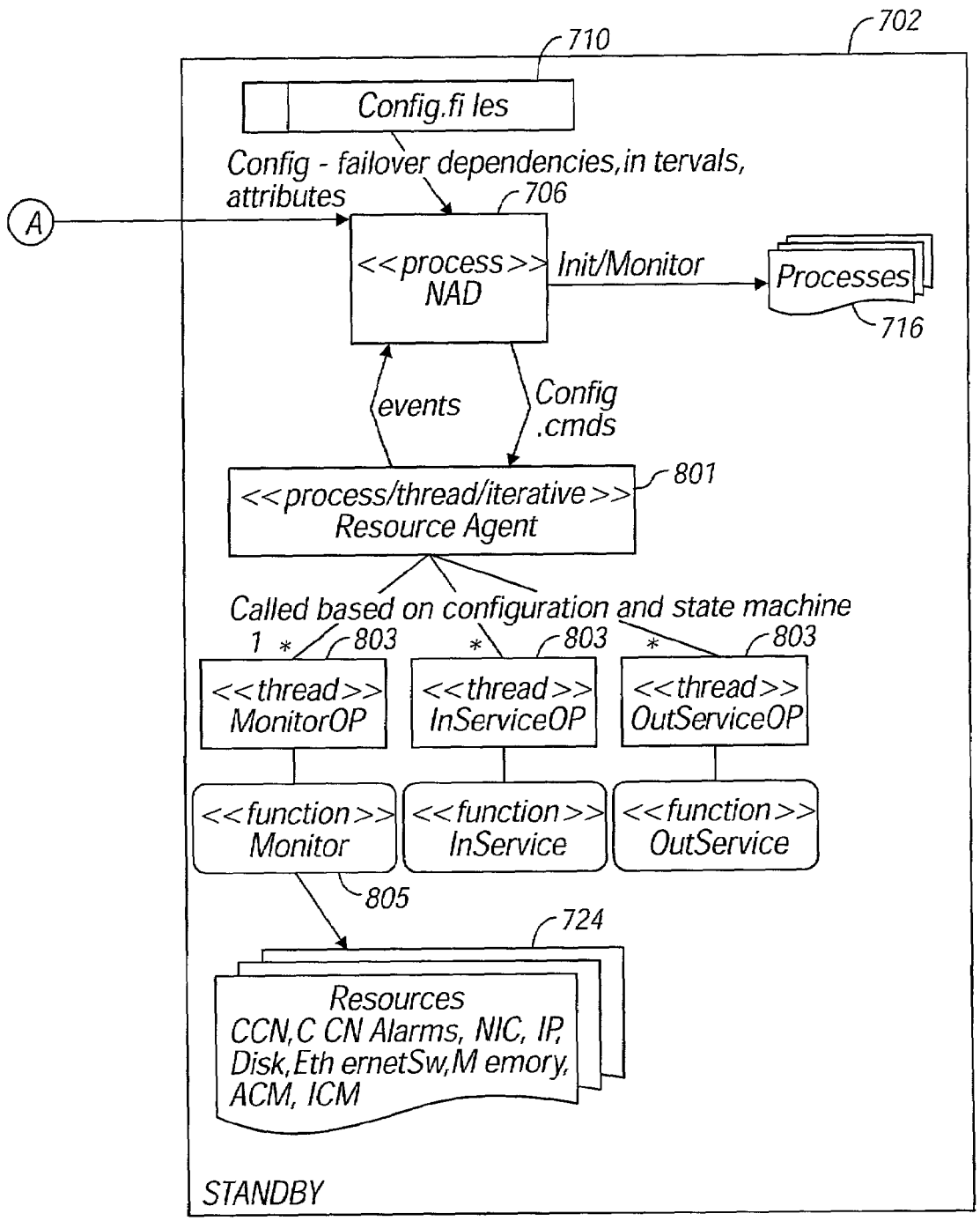

Two objectives accomplished by the present invention are to provide an extensible architecture for providing high availability services in a networked data processing system and providing a high availability system that operates in a cooperative manner with respect to telecommunications equipment management or other similar administrative systems. FIGS. 4–6 depict an extensible architecture for providing high availability for different resources and computing platforms in accordance with the preferred embodiment of the present invention. FIGS. 7–8 depict how such an architecture can interact with telecommunications equipment management systems in accordance with the preferred embodiment of the present invention.

FIG. 4 is a diagram depicting the architecture of a node availability daemon 400 in accordance with the preferred embodiment of the present invention. Node availability daemon 400 is made up of a number of software modules. A module is an aggregation of program code that can be considered a single unit. A software module will generally have a single function or purpose that enables the program code making up the module to be considered as a single unit. Modules may include, but are not limited to, functions, objects in an object oriented programming language, code libraries, and the like. Breaking a software system into modules allows the system to be scaled appropriately to fit the application at hand. As will be seen in subsequent figures, the architecture of node availability daemon 400 allows various modules to be added or removed from the basic architecture according to need. FIG. 4 represents a minimal configuration of a preferred embodiment of the present invention.

Service configurator 402 is a software module that configures the capabilities of node availability daemon 400. Service configurator 402 may, for example, read configuration files from a disk or other storage medium and apply configuration options defined in the configuration files to configure the operation of node availability daemon 400. In a preferred embodiment, service configurator 402 may dynamically link additional software module into node availability daemon 400 to match the capabilities of node availability daemon 400 desired by a user or administrator. As FIG. 4 represents a minimal configuration of node availability daemon 400, however, node failover manager 406, which represents the heart of node availability daemon 400, is shown statically linked (404) into node availability daemon 400.

Node failover manager 406 is a software module, based on the Component Configurator architecture pattern, that handles heartbeat detection and failover of resources. Node failover manager 406 includes a heartbeat module 408, which monitors the reception of heartbeat messages from another node. Similarly, a process initialization and monitor module 410 monitors for failure of software processes (software resources). Node failover manager 406 includes an interface 412 for servicing events or commands. An example of an event would be a heartbeat failure. Heartbeat module 408 and process initialization and monitor module 410, when they detect events, execute additional code in node failover manager 406 for servicing the event (e.g. performing a failover of a failed resource) through interface 412.

Interface 412 may also be used for processing commands that come from external sources, in particular, a telecommunications equipment management system. Command handler 414 is a software module that receives commands or requests from external processes, such a telecommunications equipment management system. Command handler 414 forwards the commands or requests to appropriate modules within node availability daemon 400 for processing. For example, command handler 414 can forward a command from an telecommunications equipment management system to node failover manager 406 through interface 412, which provides an interface for servicing commands.

Figure 5A:
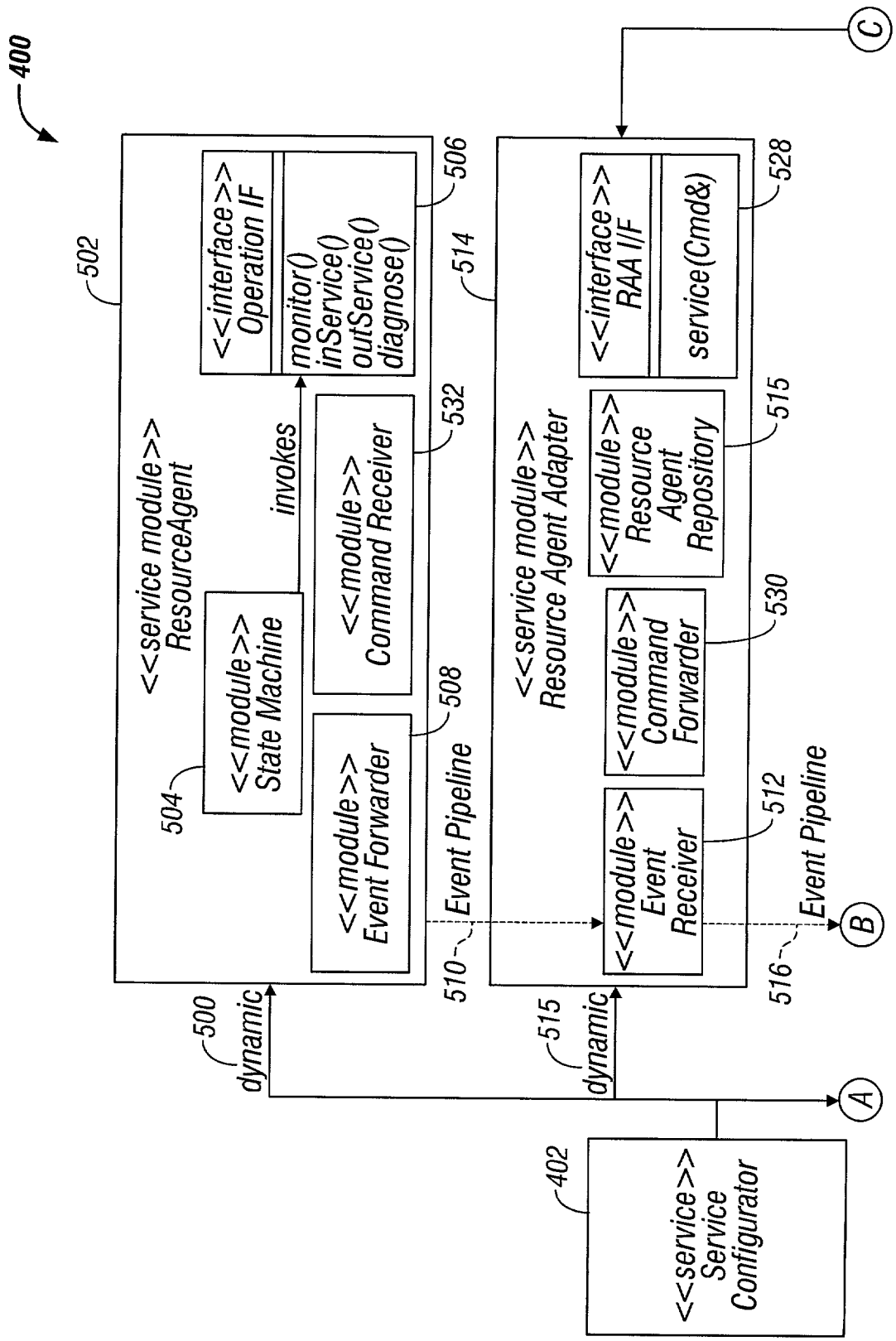
FIGS. 5A and 5B constitute a diagram depicting a more expansive configuration of a node availability daemon in accordance with a preferred embodiment of the present invention.
Figure 5B:
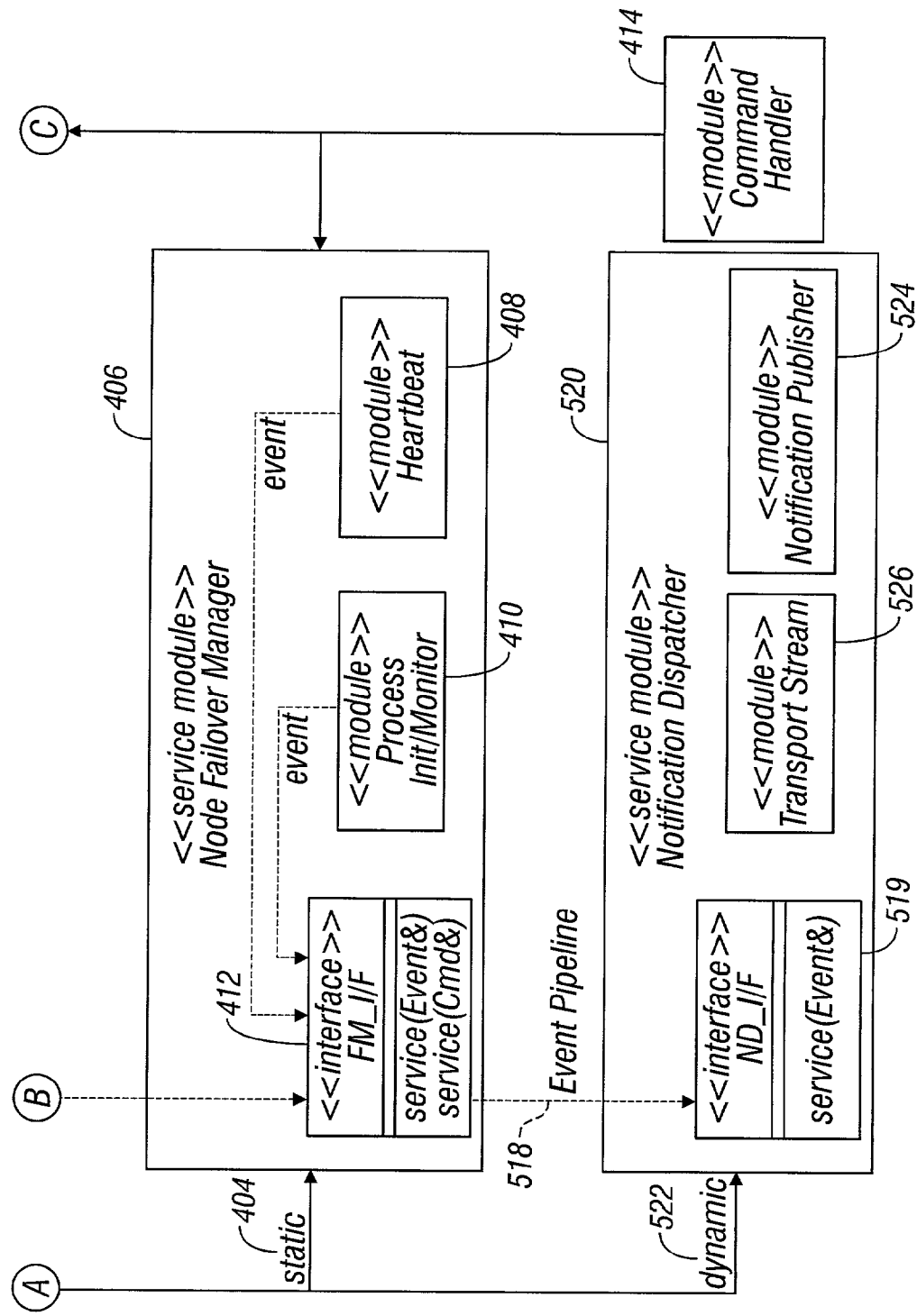

FIGS. 5A and 5B constitute a diagram of node availability daemon 400, having been expanded to include more software modules in accordance with the preferred embodiment of the present invention. The view of node availability daemon 400 provided in FIGS. 5A–5B shows that additional software modules 502, 514, and 520 have been dynamically linked (500, 515, and 522) into node availability daemon 400 to provide additional functionality. One of ordinary skill in the art will recognize that although FIGS. 5A–5B depict additional software modules 502, 514, and 520 as having been dynamically linked, in an actual embodiment, these software modules may be loaded as additional processes or threads, or statically linked into node availability daemon 400. instead. In particular, the added software modules provide functionality in two areas. Resource agent 502 and resource agent adapter 514 provide an interface or driver through which hardware resources may be monitored or controlled. Notification dispatcher 520 serves to notify additional software systems, such as a telecommunications equipment management system, of events that may occur in monitored hardware or software resources.

Turning now to the interface or driver functionality provided by resource agent 502 and resource agent adapter 514, resource agent 502 provides an interface to a specific type of resource. Resource agent 502 will include both resource-dependent and resource-independent code. A resource-independent state machine 504 or other suitable control system serves to control resource-dependent code for monitoring and controlling the resource corresponding to resource agent 502. Specifically, state machine 504 executes the resource-dependent code through a resource-independent interface 506, which provides function or method prototypes for resource-dependent operations. For example, taking a resource out of service is a resource-independent concept, but a resource-dependent operation, as the specifics of taking a resource out of service will vary depending on the resource. State machine 504 can take a resource out of service by calling the resource-dependent code for doing so by issuing a resource-independent function call through interface 506. State machine 504, through interface 506, can also respond to failures in resources by detecting the failure and taking appropriate action, such as taking the failed resource out of service. In a preferred embodiment, multiple instances of resource agents will be present.

Resource agent adapter 514 manages the set of resource agents present within node availability daemon 400. When resource agent 502, for example, detects an event such as an error, an event forwarder module 508 in resource agent 502 will forward the event (510) to resource agent adapter 514, which receives the forwarded event using event receiver module 512. Resource agent adapter 514 acts as an interface between the set of resource agents and node availability daemon 400 as a whole. Thus, events that are received from resource agents are again forwarded to a subsequent module for subsequent processing.

In FIG. 5, node failover manager 406 is the software module to which resource agent adapter 514 forwards events that it receives. As was stated before, resource agent adapter 514 manages the set of resource agents. Resource agent adapter 514 does so through the use of resource agent repository module 515 which keeps track of the various resource agents under the control of resource agent adapter 514. Thus, resource agent adapter 514 and the resource agent it manages made up an extensible interface for monitoring and controlling hardware or software resources.

Events received by resource agent adapter 514 are forwarded (516) to node failover manager 406 for further processing. Node failover manager 406 receives the events through interface 412. If the event is one that can immediately be seen to be one necessitating a failover of an active node or the software process, node failover manager 406 will perform that failover. Node failover manager 406 then forwards the event and optionally an indication that a failover has taken place (518) to notification dispatcher 520.

Notification dispatcher 520 is a software module that handles forwarding notifications of events to external processes, such as a telecommunications equipment management system. Events are received from node failover manager 406 through interface 519. Two methods of forwarding notifications by notification dispatcher 520 are shown in FIG. 5. A notification publisher module 524 forwards events to external processes that subscribe with notification publisher module 524. For example, a telecommunications system may subscribe with notification publisher module 524 to receive events corresponding to particular resources that are managed by the telecommunications equipment management system. Such subscriptions and notifications can be performed through any appropriate form of interprocess communication, including but not limited to, sockets, datagrams, semaphores, and the like.

Transport stream module 526 provides an alternative means of forwarding events. Transport stream module 526 opens a continuous channel for interprocess communications, through a pipe or socket connection, for example. Events that are received by notification dispatcher 520 are immediately forwarded by a transport stream module 526 to the open channel for interprocess communication to an external process. The four filters essentially form an event pipeline, with each of modules 502, 514, 406, and 520 forming a stage in the pipeline.

Again, command handler 414 may forward commands for an external process to node availability daemon 400 to control resources that are supervised by node availability daemon 400. When these resources are resources that are handled by resource agents, command handler 414 will forward commands to resource agent adapter 514. Resource agent adapter 514 contains a command forwarded module 530, which communicates with resource agents. Each resource agent, for instance resource agent 502, has an associated command receiver module 532, which receives commands from command forwarder 530. Command receiver 532 then executes the commands by executing resource-dependent code for carrying out the commands through interface 506.

The combination of notification dispatcher 520 and command handler 414 makes it possible for node availability daemon 400 to operate in conjunction with external processes such as a telecommunications equipment management system. The addition of resource agents allows node availability daemon 400 to be expanded to accommodate various types of resources. Thus, the expandable and configurable architecture provided in this preferred embodiment of the present invention allows the capabilities of the high availability service it provides to be adjusted to fit current needs. As this point, it should be noted that node availability daemon 400 may be configured so as to include a subset of the software modules depicted in FIG. 5. For instance, FIG. 4 depicted a configuration of node availability daemon 400 having only node failover manager 406. Other configurations are also possible, for instance, node availability daemon 400 may be operated without resource agents or a resource agent adapter, but with a notification dispatcher. Alternatively, node availability daemon 400 may be operated without notification dispatcher 520 but with resource agent adapter 514 and associated resource agents. Also, additional software modules may be placed within the event pipeline.

FIG. 6 is a diagram of node availability daemon 400 in which an additional software module has been inserted in the event pipeline. In FIG. 6, a failover rules engine 602 has been interposed between resource agent adapter 514 and node failover manager 406 in the event pipeline. Failover rules engine 602 provides an extra degree of intelligence in making the decision to failover a resource. Failover rules engine 602 receives an event (600) from resource agent adapter 514 through interface 604. Failover rules engine 602 includes a rule interpreter module 606, which makes use of rules stored in rule repository module 608 and resource dependencies stored in resource dependency tree module 610 to determine whether the received event warrants a failover of a resource. Rules stored in rule repository 608 may make use of additional information to determine whether a received event warrants a failover. For example, at certain times, for instance, periods of relative inactivity, it may not be necessary for a particular resource to have a high availability. A rule may be written, perhaps in a configuration file, and loaded into the rule repository implemented by rule repository module 608. Also, some resources may be dependent upon other resources in order to operate. For example, a peripheral device may require an interface card in order to be operated. Resource dependency tree module 610 may store information regarding which resources depend on other resources. Such information may be stored in a dependency graph, for instance. Dependency graphs are well known data structures in the computer programming art.

Once failover rules engine 602 has determined from a received event and any other data or rules that may be applicable, that a failover of a resource is necessitated, an indication of this fact may be transmitted (612) to node failover manager 406 along with an identification of the event itself. Node failover manager 406 can then take action to perform the failover. Then, node failover manager 406 can send along an indication of the event and/or the failover to notification dispatcher 520 to allow external processes such as a telecommunications equipment management system to address the event.

FIG. 7 is a diagram depicting the operation of a minimal configuration of a node availability daemon with a telecommunications equipment management subsystem of an OAM&P system in accordance with the preferred embodiment of the present invention. An active node 700 and a standby node 702 are depicted. Active node 700 has a node availability daemon 704, and standby node 702 has a node availability daemon 706. Each of node availability daemons 704 and 706 are configured using configuration files 708 and 710 respectively. Here, node availability daemon 704 and 706 are configured to use a node failover manager and notification dispatcher. Node availability daemon 704 and node availability daemon 706 send heartbeat messages (712) between each other, as well as commands or status updates, as may be appropriate. For example, when node availability daemon 704 and 706 are first set up on active node 700 and standby node 702, commands and status updates will be transmitted between the two node availability daemons during this initial setup process. In addition to sending and receiving heartbeat messages, node availability daemons 704 and 706 also monitor software processes 714 and 716, respectively, for events with respect to those processes.

If an event or failure occurs, for instance, a heartbeat failure detected by active node 700, a notification, such as heartbeat failure notification 718, will be generated by node availability daemon 704. This notification will be sent to telecommunications equipment management subsystem 720, which resides on active node 700 and which manages resources 722 and 724 residing on both active node 700 and standby node 702. Standby node 702's node availability daemon 706, which will also detect the heartbeat failure, can then take over node 700's role as the active node, initiating active services, such as additional processes or tasks.

FIG. 8 is a diagram depicting the operation of a more expansive configuration of node availability daemons in conjunction with a telecommunications equipment management system in accordance with the preferred embodiment of the present invention. In FIG. 8, active node 700 and standby node 702 are depicted again. Node availability daemon 704 and node availability daemon 706, however, are configured to include a resource agent adapter and to interact with resource agents, such as resource agent 800 and resource agent 801. Thus, node availability daemon 704 and 706 are configured in a manner that resembles the configuration shown in FIG. 5. Here, telecommunications equipment management subsystem 720 takes a less active role, because node availability daemons 704 and 706 have been configured to include additional functionality. Resource agent 800 and resource agent 801, in this preferred embodiment, includes threads 802 and 803, respectively, for handling operations with respect to monitored resources 722 and 724. For example, resource agent 800 uses monitored thread 802, which contains a resource dependent monitor function 804 to monitor a particular resource in resources 722. One of ordinary skill in the art will recognize that multiple resource agents with multiple threads having multiple resource dependent functions will serve to monitor and control the various resources in resources 722 and 724. In addition, node availability daemon 704 is capable of detecting and reporting a wider variety of events. For example, when a fault is detected in one of resources 722, node availability daemon 704 can issue a notification 808 to telecommunications equipment management subsystem 720 that the resource has failed. Likewise, when a new component is added to a system, such as an interface card, the notification of the presence of the new resource 810 can be issued to telecommunications equipment management subsystem 720 as well.

It is important to note that while the present invention has been described in the context of a fully functioning data processing system, those of ordinary skill in the art will appreciate that the processes of the present invention are capable of being distributed in the form of a computer readable medium of instructions or other functional descriptive material and in a variety of other forms and that the present invention is equally applicable regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. Functional descriptive material is information that imparts functionality to a machine. Functional descriptive material includes, but is not limited to, computer programs, instructions, rules, facts, definitions of computable functions, objects, and data structures.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

We claim:

1. A data processing system for establishing high availability of a telecommunications network resource through automatic failover while cooperating with an Operations, Administration, Maintenance, and Procedures (OAM&P) telecommunications equipment management (TEM) system, comprising:

a plurality of software modules which can be enabled to be executed in a currently executing process, said software modules including a node failover manager for servicing, when enabled, an event selected from events including a resource failure event and a request from the TEM system, wherein said servicing can include performing a failover of a monitored resource, a resource agent, including resource-dependent code, for monitoring, when enabled, a resource and forwarding an event, based on said monitoring, toward the node failover manager, a notification dispatcher for receiving, when enabled, notification of an event from the node failover manager and notifying a TEM system which has subscribed to receive such notifications;

at least one processor configured to receive configuration information identifying at least one of the software modules to be executed in the currently executing process and enable the at least one software module to be executed in the currently executing process;

providing for one or more of said software modules to be enabled to implement a delegation of responsibilities between the TEM system and said data processing system for establishing high availability, and to provide for communications of requests and events between the TEM system and the data processing system.

2. The data processing system of claim 1, wherein said plurality of software modules includes a failover rules engine receiving an event from a monitored resource, wherein said failover rules engine and failover manager are enabled, and wherein executing the failover rules engine includes:

determining, based on the received event and a set of failover rules, whether the failover manager should perform the failover of the monitored resource; and including an indication to the failover manager as to whether the failover of the monitored resource should be performed.

3. The data processing system of claim 1, wherein said plurality of software modules includes a resource agent adapter, wherein a resource agent adapter and a resource agent are enabled, and wherein executing the resource agent adapter includes:

receiving an event from a resource agent, wherein the resource agent is one of a set containing at least one resource agent.

4. The data processing system of claim 3, wherein the resource agent is one of a process, a thread, and an object.

5. The data processing system of claim 1, wherein the resource agent performs an identification of an event from the monitored resource, including:

executing said resource-dependent code that is specific to a type of the monitored resource to identify the event; and returning the identification of the event through an interface that is generic with respect to all types of monitored resources.

6. The data processing system of claim 1, wherein the event serviced by the node failover manager is a hardware failure.

7. The data processing system of claim 1, wherein the event serviced by the node failover manager is a software failure.

8. The data processing system of claim 1, wherein the event serviced by the node failover manager is a data communication failure.

9. The data processing system of claim 8, wherein the data communication failure is within a network.

10. The data processing system of claim 1, wherein the monitored resource includes hardware equipment.

11. The data processing system of claim 1, wherein the monitored resource includes a software process.

12. The data processing system of claim 1, wherein enabling the at least one software module to be executed in the currently executing process includes dynamically linking at least a portion of the at least one software module in the currently executing process.

* * * * *